(12) United States Patent
Bastin

(10) Patent No.: US 6,901,069 B2
(45) Date of Patent: May 31, 2005

(54) SUB-PACKET INSERTION FOR PACKET LOSS COMPENSATION IN VOICE OVER IP NETWORKS

(75) Inventor: Roger Bastin, Carp (CA)

(73) Assignee: Mitel Networks Corporation, Ottawa (CA)

( * ) Notice: Subject to any disclaimer, the term of this patent is extended or adjusted under 35 U.S.C. 154(b) by 824 days.

(21) Appl. No.: 09/800,194

(22) Filed: Mar. 6, 2001

(65) Prior Publication Data

US 2001/0020280 A1 Sep. 6, 2001

(30) Foreign Application Priority Data

Mar. 6, 2000 (GB) .............................. 0005376

(51) Int. Cl.[7] .............................................. H04L 12/66
(52) U.S. Cl. ..................... 370/356; 370/352; 704/265
(58) Field of Search .............................. 370/356, 352, 370/466, 400, 401, 410, 465, 467, 235, 236, 252, 353, 354, 493, 494, 495, 394, 435; 379/88.17; 709/231, 232, 234, 265

(56) References Cited

U.S. PATENT DOCUMENTS

| | | | | |
|---|---|---|---|---|
| 5,389,965 A | * | 2/1995 | Kuzma ..................... | 348/14.05 |
| 5,526,353 A | | 6/1996 | Henley et al. | |
| 5,621,660 A | * | 4/1997 | Chaddha et al. ............ | 709/247 |
| 5,742,892 A | * | 4/1998 | Chaddha ..................... | 725/146 |
| 5,768,535 A | * | 6/1998 | Chaddha et al. ............ | 709/247 |
| 6,175,871 B1 | * | 1/2001 | Schuster et al. ............ | 709/231 |
| 6,366,959 B1 | * | 4/2002 | Sidhu et al. ................. | 709/231 |
| 6,597,961 B1 | * | 7/2003 | Cooke .......................... | 700/94 |
| 6,603,774 B1 | * | 8/2003 | Knappe et al. ............. | 370/466 |
| 6,661,793 B1 | * | 12/2003 | Pogrebinsky ............... | 370/394 |
| 6,735,192 B1 | * | 5/2004 | Fried et al. ................. | 370/352 |

FOREIGN PATENT DOCUMENTS

| | | |
|---|---|---|
| GB | 2266435 | 10/1993 |
| JP | 080256131 | 10/1996 |
| JP | 200059391 | 2/2000 |
| WO | WO 9514337 | 5/1995 |
| WO | WO 9954801 | 10/1999 |
| WO | WO 0133788 | 5/2001 |

OTHER PUBLICATIONS

International Search Report.
Search Report of Great Britain Application No. GB 0005376.9.

* cited by examiner

Primary Examiner—Wellington Chin
Assistant Examiner—Jamal A. Fox
(74) Attorney, Agent, or Firm—F. Chau & Associates, LLC

(57) ABSTRACT

A method of compensating within a receiving endpoint for lost audio packets transmitted across an IP network, comprising the steps of storing a packet buffer of samples as a plurality of sub packets within a jitter buffer, inserting at least one interpolated sub packet between successive sub packets in the buffer, and playing out the sub packets from the buffer, such that only small portions of the jitter buffer are replayed at specific times to minimize the negative effects on voice quality. The inventive method inserts the replayed portions to compensate for packet loss in a way that results in only a relatively low processing burden.

6 Claims, 2 Drawing Sheets

SUB-PACKET INSERTION FOR PACKET LOSS COMPENSATION IN VOICE OVER IP NETWORKS

FIELD OF THE INVENTION

This invention relates in general to digital signal transmission, and more particularly to a sub-packet insertion method for packet loss compensation method in voice over IP (VOIP) networks.

BACKGROUND OF THE INVENTION

The transmission of voice and audio data over IP networks presents some inherent challenges regarding end to end quality of service. Specifically, packet loss, packet delays and packet jitter are characteristics that can significantly impact voice quality.

From an endpoint's (e.g. phone) perspective on an IP network, packet loss occurs in an arbitrary, unpredictable fashion. Packet loss is out of the endpoint's control and typically occurs due to a collision or some network overload (e.g. in a router or gateway). Since the packet loss can occur in the physical implementation of the network (e.g. collisions in cables) there is no guaranteed mechanism to inform the receiver when a packet is missing. Therefore, sequence numbers are used to allow the receiver to detect packet loss. Also, once lost, the packet is not re-transmitted since the associated delay in retransmission is prohibitive in real time telephony applications. Thus, the onus is on the receiving endpoint to implement some form of detection and compensation for packets lost in the network. The challenge in this respect is to adequately reconstruct the original signal and maintain a sufficient level of voice quality.

Packet delay and packet jitter are additional network phenomena that require measures of compensation to maintain voice quality. As packets travel from a source endpoint to a destination endpoint they are typically relayed through various routers or hubs along the way. As a result of variable queuing delays and variable routing paths, sequential periodic packets sent from a source can arrive out of order and with substantial delay and jitter at the destination endpoint. Typically a receiver manages these issues by implementing a buffer of packets to smooth the variable jitter and to allow the receiver to re-arrange packets into their proper order. Unfortunately such a buffer increases the nominal delay of the audio stream depending on its size, and as such must be minimized since audio delay has its own negative effect on voice quality. This minimization prevents 100% compensation for delay and jitter in the receiver and effectively increases the rate of packet loss in the system since a late packet cannot be inserted into an ongoing audio stream.

Most applications use the aforementioned buffer of packets to handle jitter and packet delay. Routines that manage this buffer monitor incoming sequence numbers and detect both lost and late packets. In telephony applications packets are usually delay constrained to 10, 20 or 30 ms in size. To compensate for a loss of this duration the receiving endpoint can replay a previous packet, decrease the playout rate (assuming the jitter buffer is of sufficient size), interpolate samples or implement a silence detection and insertion scheme.

Simple replaying of a previous packet is computationally trivial yet often yields unsatisfactory results since voice quality dramatically suffers as packet loss increases. A variation of this scheme is to replace the lost packet with an idle or zeros packet but this too is quite noticeable under even marginal packet loss.

Decreasing the playout rate and interpolation between samples are effectively the same thing; both alter the receive sample rate to reduce the consumption rate of samples. Playout adjustment is implemented in the prior art via hardware for adjusting the sample clock or the sample frame length, whereas interpolation is implemented in the prior art as a software method of inserting additional samples by means of averaging. Both methods have an undesirable side effect of causing a frequency shift of the signal due to the change in sample rate. To minimize the frequency shift only small adjustments to the sample rate can be made. However, under conditions of packet loss, small adjustments do not provide an adequate rate of compensation.

Prior art silence detection algorithms monitor the signal stream to determine the intervals between voice where the signal consists of merely background noise. Silence insertion is the process of using the silence detection information to insert additional silence periods to compensate for lost packets. This method can be effective if there are many silence intervals or if the jitter buffer is large enough to guarantee some silence intervals most of the time. Unfortunately in voice conversations silence periods are often very small (between words) and they cannot be guaranteed during the time frame of a typical jitter buffer. Furthermore, silence detection imposes an additional processing burden when compared to the other prior art methods of compensation.

SUMMARY OF THE INVENTION

According to the present invention, a method is provided for packet loss compensation in real time voice over IP applications. The method of the invention allows a receiving endpoint to dynamically detect and recover from packet loss with minimal processing overhead. Specifically, a hybrid method of packet loss compensation is provided in accordance with which only small portions of the jitter buffer (referred to herein as sub packets) are replayed at specific times to minimize the negative effects on voice quality. The inventive method inserts the replayed portions to compensate for packet loss in a way that results in only a relatively low processing burden.

BRIEF DESCRIPTION OF THE DRAWINGS

A detailed description of the preferred embodiment is set forth herein below with reference to the following drawings, in which.

DETAILED DESCRIPTION OF THE PREFERRED EMBODIMENT

The basic features of any voice over IP implementation are a transmitting and receiving endpoint separated by an IP network. The IP network consists of various interconnected elements such as hubs, routers and gateways. From an endpoint perspective, however, the interface is simply a connecting IP cable which can be viewed as a dedicated connection from transmitter to receiver.

Figure 1:
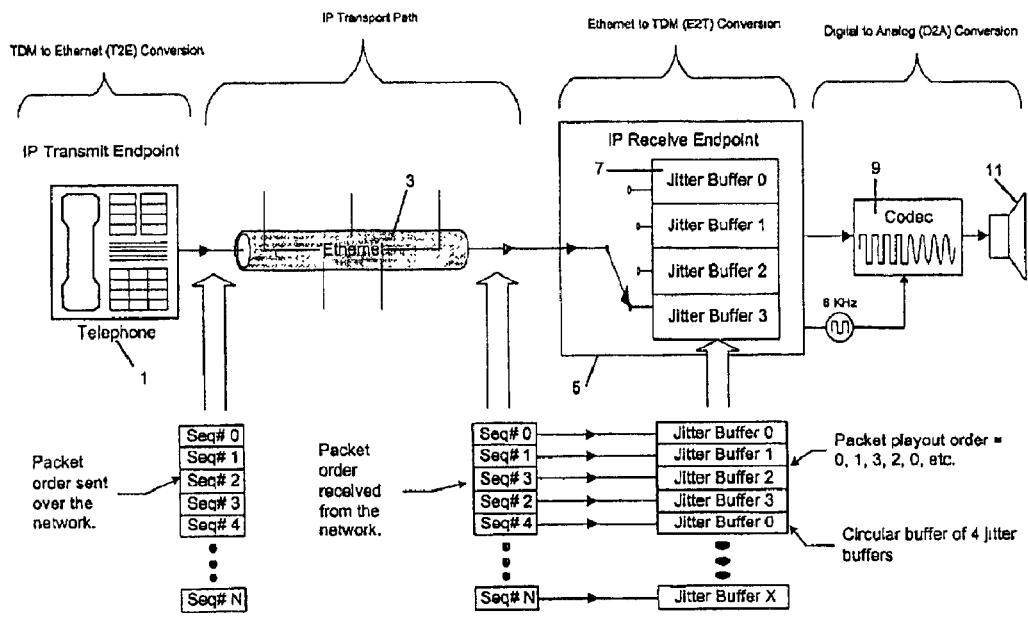
FIG. 1 is a block diagram of a voice over IP (VOIP) network forming the environment in which the invention is implemented.

Thus, as shown in FIG. 1, a transmitting endpoint 1 on the IP network simply accumulates samples from its Analog to Digital process (TDM to Ethernet (T2E)) into a packet or payload buffer within the endpoint 1, according to a sequential order. Once the buffer is fall the endpoint transmitter wraps a packet header around the payload and transmits this across the network 3 with appropriate addressing and sequence information in the header, as is well known in the art. The routing information in the header describes the final destination and is attached to each and every packet (e.g. Seq# 0, Seq# 1, etc.). Due to multiple network routing paths and/or variable queuing delays at each routing hop across the IP network 3, transmitted sequential packets can become out of order at the receiving endpoint. This is shown in FIG. 1 by the fourth packet (Seq# 3) arriving ahead of the third packet (Seq# 2). The receiving endpoint 5 corrects these sequencing errors by buffering the packets in the correct order within a jitter buffer 7, prior to the digital-to-analog conversion (Ethernet to TDM (E2T) process) and playback via codec 9 and speaker 11.

Figure 2:
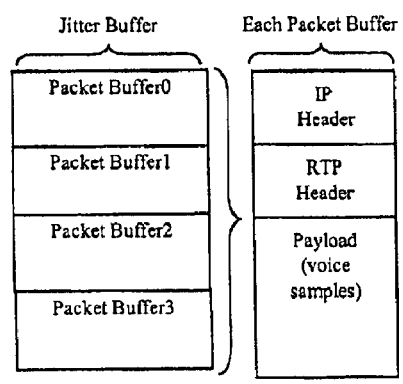
FIG. 2 is a diagrammatic representation of a typical jitter buffer.

The jitter buffer 7 is conventionally implemented as a simple ring buffer of sequentially ordered IP packet buffers. Each packet buffer contains an IP header section, an RTP (Real Time Protocol) header section and the packet payload as shown in FIG. 2. The payload comprises a buffer of samples to be played according to the sequence number in the RTP header. The jitter handling capability is determined by the size of the jitter buffer 7. This size (in number of packets) is an architectural parameter, however, as previously mentioned, the jitter buffer 7 must be minimized to limit the end to end delay. This can lead to effective packet loss when the packet jitter exceeds the buffer's capabilities. Additionally if a packet is lost in the network 3 due to a collision or overload (e.g. if Seq# 3 in FIG. 1 were lost instead of out of order), the jitter buffer 7 will detect the mismatch in packet order but is unable to compensate.

In prior art packet loss compensation schemes, replaying any subset of a voice stream is a form of interpolation. As indicated above, it is commonplace in the prior art to replay an entire packet to compensate for the loss of a packet. This method is noticeable for most users as a stuttering effect, since the packet size is usually tens of milliseconds in duration. It is also known in the art to either replay one sample at a time or interpolate to generate an additional sample. Both approaches suffer from the disadvantage of decreasing the frequency of the voice signal. Even interpolating every 5th or 10th sample causes a noticeable frequency shift and is often insufficient in compensating for lost packets in a timely fashion.

According to the present invention, each packet buffer is divided into smaller sub packets to allow the replaying of sub packets as a compromise between the two prior art approaches discussed above. A sub packet is simply a short sequence of samples contained in the payload of a given packet buffer. The non-obvious benefit of the sub packet approach is that the frequency shift of sample interpolation becomes less noticeable as the sub packet size increases while the stuttering effect of packet replay decreases as the sub packet size decreases. The choice of sub packet size thus becomes critical in the tradeoff between these two competing requirements. According to the best mode of this invention, a one-millisecond sub packet is selected based on experimental results.

Figures 3, 4:
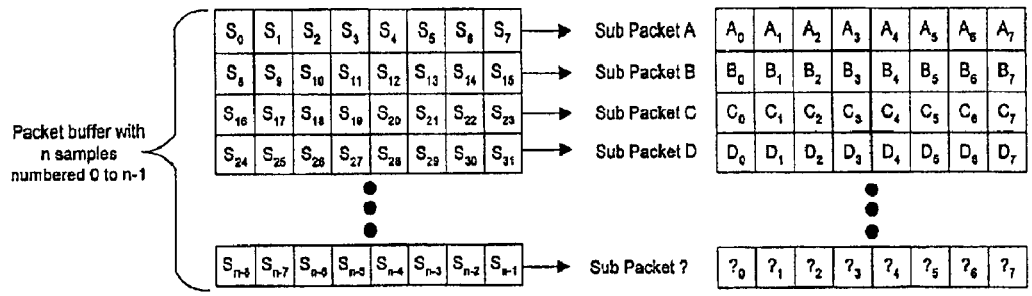
FIG. 3 shows an arrangement of sub packets in a jitter buffer in accordance with the invention.
FIG. 4 shows the insertion of sub packets in accordance with the packet loss compensation method of the present invention.

FIG. 3 shows how a packet payload buffer with n samples is divided into sub packets according to the present invention. A typical value for n is 160 samples (i.e. 20 milliseconds of voice). Thus, in accordance with the best mode of the invention, choosing a 1 millisecond sub packet yields 20 sub packets per packet buffer.

When either the receiver 5 has either detected a packet loss or detects that the sample count of jitter buffer 7 is beginning to underflow, it enables the packet loss compensation algorithm according to the invention. It has been determined by experimentation that one packet remaining in the jitter buffer 7 represents a sufficient threshold for detection. The packet loss compensation method comprises inserting an interpolated sub packet for playout after every other sub packet period (in this case 1 ms), as shown in FIG. 4. This replay period is chosen to minimize both the stuttering effect and the frequency shift while quickly reclaiming the lost packet (i.e. the remaining samples in the jitter buffer 7 are "expanded" by 50%). The inserted sub packet is interpolated to minimize the transition effects between sub packets. This is accomplished by a simple weighting scheme to make the first samples of the replayed sub packet resemble the first samples of the next sub packet to be played (which would have been what the first playout would have flowed into without the compensation).

To further minimize the stuttering effect, the compensation method of the present invention is only invoked when the underflow situation is critical. Thus, if compensation has occurred for several sub packets and a new, subsequent packet arrives, the compensation algorithm is suspended until the sample count again decreases to the critical threshold. This automatically spreads the compensation out at a decreasing rate, which is less noticeable to the human ear.

The computational burden of the sub packet insertion scheme is relatively lightweight compared to prior art silence detection/insertion schemes. The insertion of a sub packet into the playout stream every other sub packet period is straightforward since the previous sub packet buffer can often be re-used and only three samples require modification to implement the smoothing process. The inserted sub packet results from a simple scaling of two samples followed by averaging (usually implemented as a shift if the scaling ratio is chosen as a power of two).

The following pseudo code shows a preferred implementation of the sub packet insertion method according to the invention:

```
#define SUB_PACKET_SIZE 8 /* In samples */
int current_sp[SUB_PACKET_SIZE];
int nex_sp[SUB_PACKET_SIZE];
void smooth_sub_packet(void)
{
current_sp[0]=(current_sp[0]+3 * next_sp[0])>>2;
current_sp[1]=(2 * current_sp[1]+2 * next_sp[1])>>2;
current_sp[2]=(3 * current_sp[2]+next_sp[2])>>2;
}
If (packet compensation mode AND in_odd_sub_
  packet)
{
CALL smooth_sub_packet and RESEND current_sp
}
```

By inserting weighted sub packets after every other sub packet period, the packet loss compensation method of the present invention can compensate for lost packets at a 50% compensation rate. Thus, if 20 ms of data is remaining when compensation begins, the receiver 5 will play out data for 30 ms before suffering data starvation, which is ample time to receive a subsequent packet.

Alternative embodiments and variations of the invention are possible.

The preferred embodiment sets forth one example of specific weighting factors and sub packet sizes. Variation of these parameters may yield better results for specific applications as packet size, sample size, sample rate and type of audio vary according to system architecture. Additionally, the method of smoothing can vary according to the rate of packet loss. For example, in some applications packet loss may be quite infrequent so all that may be necessary is to interpolate one sub packet per packet buffer in order to provide adequate packet loss compensation.

Furthermore, whereas the principle usage of the packet loss compensation scheme of the present invention is in Voice over IP architectures (VoIP)—that is, in traditional telephony applications and services, the principles of the invention may also be applied to applications where other audio sources (such as music) are sent across the IP network 3. Thus, the general application of the invention is to compensate for packet loss in audio sent over IP networks, where the audio is destined for the human ear to receive and interpret.

All such alternatives and variations are believed to be within the sphere and scope of the invention as set forth in the claims appended hereto.

What is claimed is:

1. A method of compensating within a receiving endpoint for lost audio packets transmitted across an IP network, comprising the steps of:

storing a packet buffer of samples as a plurality of sub packets within a buffer;

inserting at least one interpolated sub packet between successive sub packets in said buffer; and playing out said sub packets from said buffer, wherein each said interpolated sub packet comprises a weighted average of present and next ones of said successive sub packets to be played out of said buffer such that first samples of the interpolated sub packet resemble first samples of said next one of said successive sub packets.

2. The method of claim 1, wherein said weighted average is:

$PN_m=0-(M-1)=(mP_m+(M-m)N_m)/M$, wherein $P0-(M-1)$ represents samples 0 to $(M-1)$ of M samples of the present sub packet, and $N0-(M-1)$ represents samples 0 to $(M-1)$ of M samples of the next sub packet.

3. The method of claim 2, wherein each said interpolated sub packet is inserted as follows:

```
#define SUB_PACKET_SIZE 8 /* In samples */
int current_sp[SUB_PACKET_SIZE];
int nex_sp[SUB_PACKET_SIZE];
void smooth_sub_packet(void)
{
current_sp[0]=(current_sp[0]+3*next_sp[0])>>2;
current_sp[1]=(2*current_sp[1]+2*next_sp[1])>>2;
current_sp[2]=(3*current_sp[2]+next_sp[2])>>-;2;
}
If (packet compensation mode AND in_odd_sub_packet)
{
CALL smooth_sub_packet and RESEND current_sp
}.
```

4. A method of compensating within a receiving endpoint for lost audio packets transmitted across an IP network, comprising the steps of:

storing a packet buffer of samples as a plurality of sub packets within a buffer;

inserting at least one interpolated sub packet between successive sub packets in said buffer;

playing out said sub packets from said buffer; and inserting interpolated sub packets between every other one of said sub packets in said buffer, wherein each of said sub packets is of 1 ms duration.

5. A method of compensating within a receiving endpoint for lost audio packets transmitted across an IP network, comprising the steps of:

storing a packet buffer of samples as a plurality of sub packets within a buffer;

inserting at least one interpolated sub packet between successive sub packets in said buffer; and playing out said sub packets from said buffer, wherein said step of inserting at least one interpolated sub packet between successive sub packets is only performed when said buffer contains less than a predetermined threshold number of sub packets.

6. The method of claim 5, wherein said predetermined threshold number of sub packets is equivalent to the number of samples in a single packet buffer.

* * * * *